(12) United States Patent
Bertoglio

(10) Patent No.: US 6,830,805 B2
(45) Date of Patent: Dec. 14, 2004

(54) METHOD AND APPARATUS FOR MANUFACTURING PRODUCTS THROUGH THE USE OF WASTE MATERIALS OF VARIOUS KIND, AND PRODUCT OBTAINED THEREWITH

(75) Inventor: Mario Bertoglio, Udine (IT)

(73) Assignee: Elma Chemicals Srl, Udine (IT)

( * ) Notice: Subject to any disclaimer, the term of this patent is extended or adjusted under 35 U.S.C. 154(b) by 137 days.

(21) Appl. No.: 10/166,397

(22) Filed: Jun. 10, 2002

(65) Prior Publication Data

US 2002/0150718 A1 Oct. 17, 2002

Related U.S. Application Data

(60) Division of application No. 09/906,348, filed on Jul. 16, 2001, now Pat. No. 6,423,254, which is a continuation-in-part of application No. 09/283,558, filed on Apr. 1, 1999, now abandoned.

(30) Foreign Application Priority Data

Dec. 22, 1998 (IT) .......................................... TV98A0162

(51) Int. Cl.$^7$ ................................................. B32B 3/06
(52) U.S. Cl. .............................. 428/306.6; 428/317.9; 428/318.6; 428/903.3; 521/40.5
(58) Field of Search ...................... 428/306.6, 317.9, 428/318.6, 903.3; 521/40.5

(56) References Cited

U.S. PATENT DOCUMENTS

| | | | | |
|---|---|---|---|---|
| 3,864,193 A | * | 2/1975 | Frierson et al. | 428/133 |
| 4,402,889 A | * | 9/1983 | Bonis | 264/37.32 |
| 5,217,800 A | * | 6/1993 | Pentecost | 428/297.4 |
| 5,238,622 A | * | 8/1993 | Grimmer | 264/45.5 |
| 6,423,254 B1 | * | 7/2002 | Bertoglio | 264/45.3 |

* cited by examiner

Primary Examiner—Allan R. Kuhns
(74) Attorney, Agent, or Firm—Bucknam and Archer

(57) ABSTRACT

There is disclosed a method for manufacturing products through the use of waste materials of various kind, such as heterogeneous plastic materials, wood, minerals, etc., derived from recycling processes, differentiated waste collection systems, solid urban wastes, industrial processing scraps or by-products, and the like, such products being adapted to be used in a wide range of most varied applications, particularly though not exclusively for manufacturing structural parts and decorative finishes for office furniture as well as furniture for cinematography theaters, communities, concert halls and the like.

9 Claims, 8 Drawing Sheets

FIG. 3
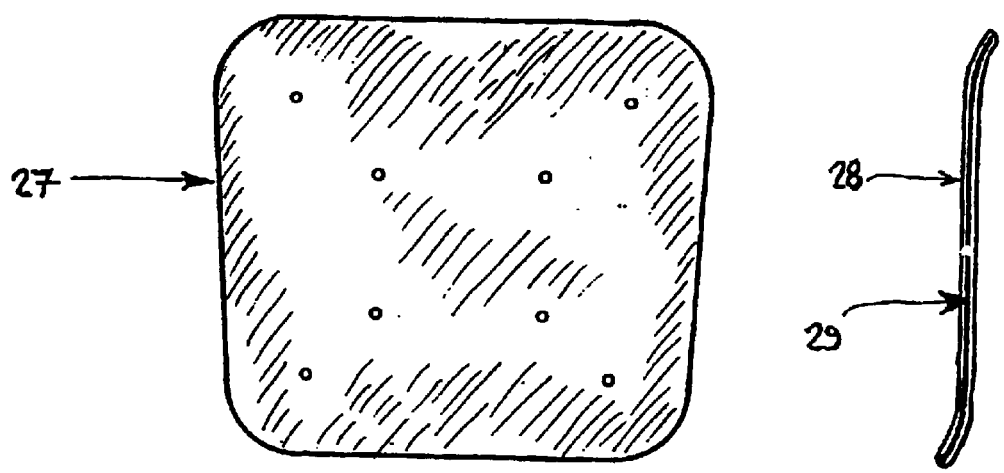
FIG. 4
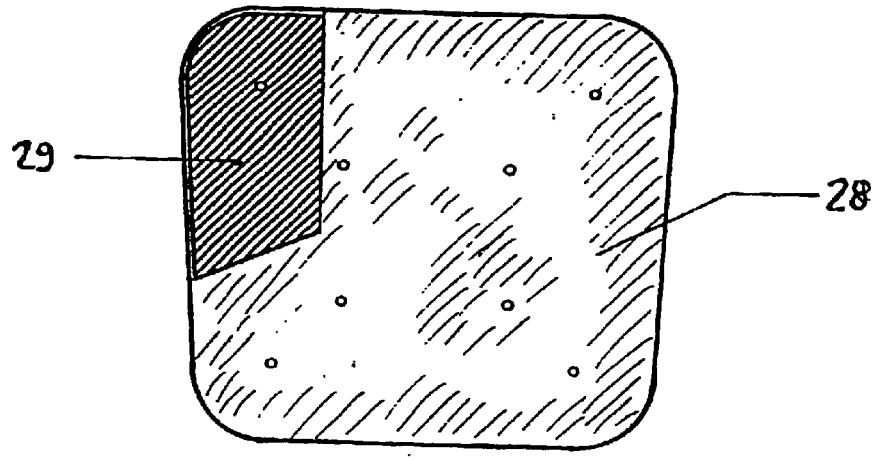
FIG. 5

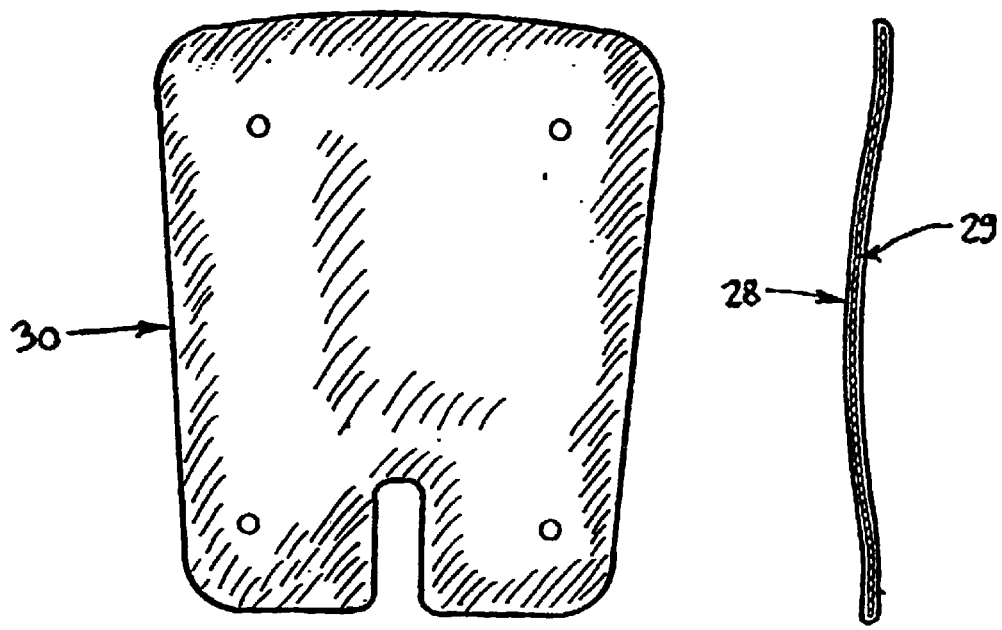
FIG. 6
FIG. 7
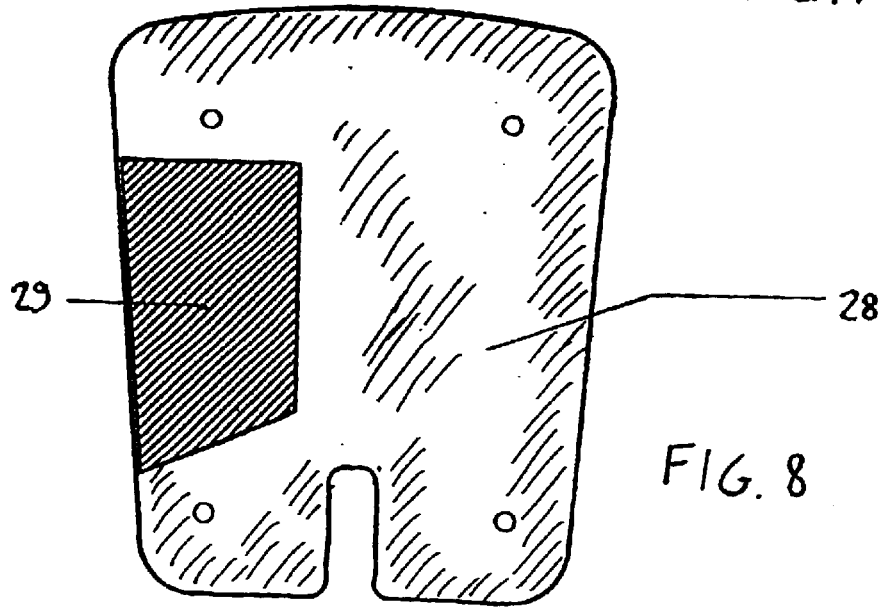
FIG. 8

FIG. 9
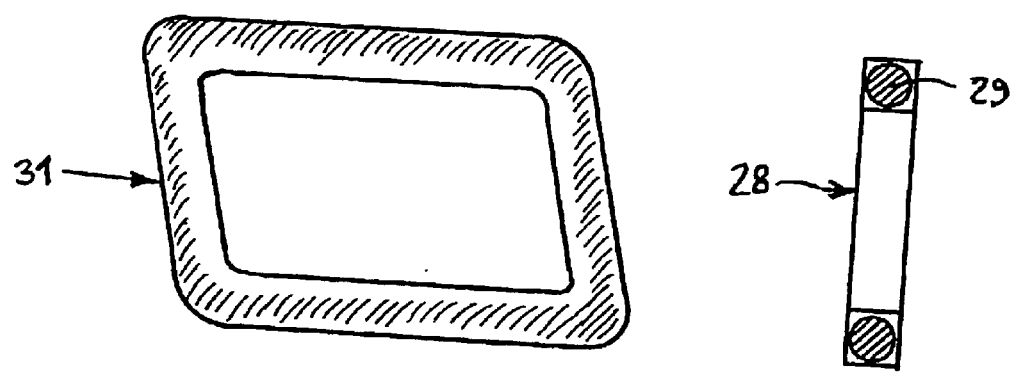
FIG. 10
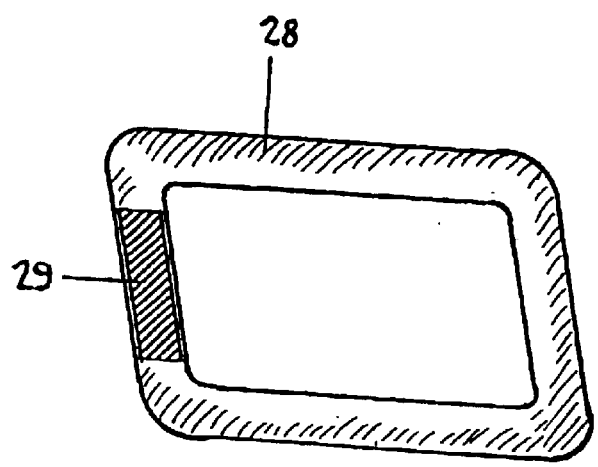
FIG. 11

METHOD AND APPARATUS FOR MANUFACTURING PRODUCTS THROUGH THE USE OF WASTE MATERIALS OF VARIOUS KIND, AND PRODUCT OBTAINED THEREWITH

This is a divisional application of application Ser. No. 09/906,348, filed Jul. 16, 2001 U.S. Pat. No. 6,423,254, which is a continuation-in-part of application Ser. No. 09/283,558, filed Apr. 1, 1999.

The present invention refers to a method and an apparatus for manufacturing products through the use of waste materials of various kind, such as heterogeneous plastic materials, wood, minerals, etc., derived from recycling processes, differentiated waste collection systems, solid urban wastes, industrial processing scraps or by-products, and the like, such products being adapted to be used in a wide range of most varied applications, particularly though not exclusively for manufacturing structural parts and decorative finishes for office furniture as well as furniture for cinematoghraph theatres, communities, concert halls and the like.

The present invention also relates to a product obtained with the above mentioned method and the apparatus.

Currently, the fabrication of products of different type, shape and size is carried out using exactly the materials required by each respective application, such as for instance plastic materials and metal materials of various kind, natural wood or wooden materials of a traditional type, etc., and appropriately processing and shaping these materials with machines, tools and processing methods that are commonly known in the art, so that these products quite often call for the availability of raw materials that may be very expensive and, sometimes, rather difficult to find on the market.

On the other hand, the possibility also exists for products to be manufactured starting from waste materials of various kind, such as for instance metal materials, plastic materials, wood and the like deriving from sorted-out waste collection activities, industrial processing scraps and by-products, recycling processes and the like, whose composition is prevailingly made up by polyolefins (LDPE, LLDPE, HDPE, MDPE, PPO-PPC), which constitute up to approx. 80% of the total, and a heterogeneous mix of PET, PA, PVC, ABS, PS, POM and various polymer blends, wherein such materials are used either separately or in combination with the commonly used raw materials, with a resulting advantage in terms of both recovery and reuse of otherwise useless materials and reduction in overall manufacturing costs. In these cases, however, processing such heterogeneous waste materials prove extremely difficult and quite often even impossible to be completed to any acceptable appropriateness due to poor compatibility and blendability of the same materials, owing mainly to the different melting temperatures required by the various materials used, which involve the risk for the same materials to be downgraded, i.e. to suffer damages, as well as toxic or noxious substances to be possibly developed during processing.

It therefore is a main purpose of the present invention to recover and recycle heterogeneous waste materials, to be used either alone or in combination with raw materials of a traditional type, in a process for manufacturing products of various kind in which said materials are able to be effectively and homogeneously mixed or blended together in a simple manner, without giving rise to any of the above mentioned drawbacks, while thereby enabling overall costs to be reduced to a significant extent and the problems connected with the otherwise necessary disposal of the waste materials involved to be avoided.

The present invention also relates to an apparatus for implementing such a manufacturing method, as well as a product obtained with such a method and such an apparatus.

BRIEF DESCRIPTION OF THE DRAWINGS

The features and advantages of the present invention will anyway be more readily understood from the description that is given below by way of non-limiting example with reference to the accompanying drawings, in which:

FIG. 3 is a front view of a product capable of being manufactured with the method according to the present invention;

FIG. 4 is a schematical side view of the product of FIG. 3;

FIG. 5 is a schematical, partially sectional front view of the product of FIG. 3;

FIG. 6 is a front view of a further product capable of being manufactured with the manufacturing method according to the present invention;

FIG. 7 is a side view of the product of FIG. 6;

FIG. 8 is a schematical, partially sectional front view of the product of FIG. 6;

FIG. 9 is a front view of yet another product capable of being manufactured with the method according to the present invention;

FIG. 10 is a side view of the product of FIG. 9;

FIG. 11 is a schematical, partially sectional front view of the product of FIG. 9;

DETAILED DESCRIPTION OF THE INVENTION

Figure 1:
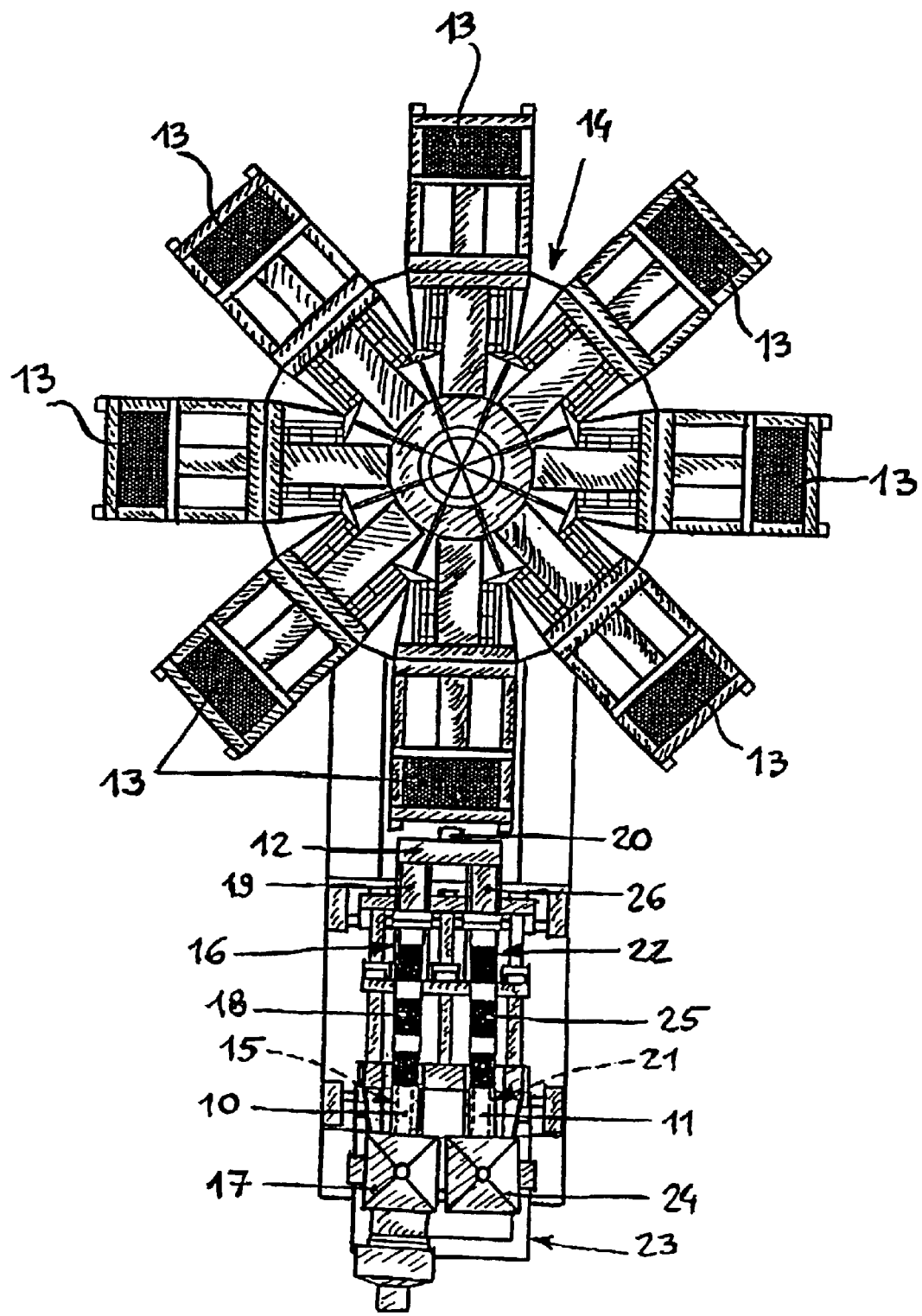
FIG. 1 is a schematical view of the apparatus used to manufacture products according to the method covered by the present invention.

The present invention relates to a method and an apparatus for manufacturing products of different kind using waste materials of various kind, such as for instance wood, minerals, metal materials, heterogeneous plastic materials, deriving from sorted-out waste collection activities, industrial processing scraps and by-products, recycling processes and the like, whose composition is prevailingly made up by polyolefins (LDPE, LLDPE. HDPE, MDPE, PPO-PPC), which constitute up to approx. 80% of total wastes, and a heterogeneous mix of PET, PA, PVC, ABS, PS, POM and various polymer blends, which constitute the remaining approx. 20% of usual wastes.

The present invention also relates to the products obtained with such a manufacturing method and apparatus, wherein such products are advantageously constituted by structural parts and external or decorative finishes for chairs and seats for office desks, cinematograph theatres, concert halls, communities, households, etc., by furniture of different kind and related component parts such as doors, shutters, panels, frames, etc., though the products may of course be of any other type for the most varied applications, as long as they are compatible with the manufacturing method according to the present invention, without therefore departing from the scope of the present invention.

The above mentioned waste materials can be used separately or, possibly, even in combination with raw materials of a traditional type (i.e. wood, plastics, metals and related alloys, etc.), wherein such raw materials are preferably used in lower proportions as compared with said waste materials in order to thereby cut usage of valuable materials, and of course the related costs, to a considerable extent.

In the method according to the present invention, waste materials, along with the raw materials that may possibly be used in combination therewith, are first of all shredded into tiny particles with a size ranging from 1 to 10 mm and then appropriately mixed together, with the use of equipment of a traditional type to that purpose, thereby forming a blend to which pre-determined amounts of per se known heat-stabilizing substances are added in the case that PVC is present to some extent in such a blend. Considering that generally available waste materials are in practice constituted to a large extent by PE and PP in differing percentages, it ensues that such plastic materials will also be present to a prevailing extent in the blends used to carry out the manufacturing method according to the present invention. Anyway, a reduced percentage of blowing agent is then added to the so formed blend in view of the fact that, owing to the reaction triggered by the presence of heat in the subsequent phases of the manufacturing method considered, such a blowing agent will become active in bringing about a foaming of the heated-up blend for the reasons that are explained in greater detail further on.

As far as such a blowing agent is concerned, use can be made here of any blowing agent that is used traditionally to bring about foaming effects in processed plastics, such as for instance in the processing of polyurethane foams, and such a blowing agent can by mere way of example be constituted by POAZCD (hexantriolethylcycloexyltriazol-azo discarbonamide) in a percentage ranging preferably from approx. 0.2% and approx. 1.0% by volume of the actual blend.

The so obtained blend represents a first component adapted to form the inner portion, i.e. the portion not exposed to view, of each product that may be manufactured with the method according to the present invention, in which said first component is therefore fed into a traditional plastic processing machine, such as an extruder, where said blend is heated up in order to bring about a selective melting of the therein contained plastic materials which are generally known to possess different melting temperatures comprised between approx. 110° C. and 140° C. for such materials as LDPE, LLDPE, MDPE and HDPE, approx. 160° C. and 170° C. for such materials as PP, ABS, PS and PVC, and approx. 270° C. and 280° C. for such materials as PA and PET.

In particular, the blend is in this case heated up to a temperature that is preferably comprised between 180° C. and 210° C., thereby causing plastic materials with a progressively increasing melting temperature to melt selectively, until they eventually form a plasticized, i.e. molten mass, thereby creating a condition in which the remaining portion of the blend constituted by plastic materials with melting temperatures that are higher than said upper heating temperature is softened, but not molten, so that it can mix with and be compounded into said molten mass, thereby acting as inert filling materials.

In the case that such a blend contains any portion of PVC, which would therefore degrade under chlorine formation at said heating temperature of approx. 180° C. to 210° C., whereby said chlorine would in turn react with the other substances contained in the plastics under formation of undesired compounds, and would further char the other plastic materials in the blend, such PVC contents are melt without giving rise to any of the afore mentioned drawbacks thanks to the presence in the blend of the heat stabilizing substances mentioned earlier in this description.

At the end of this phase of the method, the molten mass, containing said not yet molten plastic materials acting as fillers, is delivered by the above mentioned plastic processing machine and is therefore available for forming the desired products in the manner that will be described in greater detail further on.

The method according to the present invention calls further for the preparation of a second component of the products to be manufactured, which shall be adapted to coat, i.e. cover said afore mentioned inner portion of the same products so as to form the outer portion, i.e. the portion that is actually exposed to view, of each such product, wherein even such a second component is obtained in the form of a blend constituted by waste materials, possibly in combination with raw materials of a traditional type, which are again first of all shredded into tiny particles and mixed together as described above in conjunction with the preparation of said first component, however without any addition of heat stabilizing substances and blowing agents, but with the addition of per se known colorants (master batches) in the desired hues, in a smaller proportion with respect to the mass of the blend, but anyway sufficient to effectively colour the products manufactured with the method.

This blend is then fed into a plastic processing machine of a traditional type, such as an extruder, which is anyway different and separated from the afore mentioned machine, and in which said blend is heated up so as to bring about a selective melting of the plastic materials having different melting temperatures comprised within the afore indicated ranges.

Even in this case, the blend is heated up to a temperature comprised between approx. 180° C. and 210° C., thereby behaving much in the same way as the afore described blend, wherein a molten mass is again available at the end of this phase for forming the desired products.

In the subsequent operational phase of the manufacturing method according to the present invention, this latter molten mass is delivered by the above described plastic processing machine and injected in the moulding cavity of at least a separate mould which is given the same shape as the respective parts to be manufactured, wherein also the molten mass of the afore described first component of the product, coming from the respective plastic processing machine, is at the same time injected in said mould cavity, thereby giving rise to a condition in which both molten masses are able to homogeneously mix with each other, so that the blend with a lower density and a higher fluidity will tend to arrange itself against the inner walls of said moulding cavity, thereby forming a thin uniform layer that constitutes the outer coating of each finished product, whereas the blend with a higher density and a lower flowability (as determined by the inert filling materials compounded in the blend) will in turn arrange itself in the space comprised between the mould plates which is not occupied by the other blend, thereby forming the compact core, or inner portion, of each finished product.

Towards the end of the moulding operation, the denser blend forming the core, i.e. inner portion of the product tends to progressively swell owing to the presence of the blowing agent which is generally known to react in the presence of high heating temperatures, thereby determining a progressive compression action that is exerted from the interior to the exterior of the product being manufactured and, as a result, causing the outer coating of the same product to more effectively adhere against the walls of the inner cavity of the mould, such an adhesion having the effect of considerably opposing the unavoidable shrinkage of the mass of the material of such a product, which tends to occur during the subsequent cool-down phase, thereby practically preventing finished products from undergoing undesirable deformations and dimensional variations at the end of the moulding operation, while at the same time assuring an extremely satisfactory decorative outlook, i.e. aesthetics, of the same products.

It should be noticed at this point that, thanks co the presence of the two afore mentioned different components, which are formed by waste plastic and other materials, either alone or combined with new materials, and unavoidably have different density and flowability properties, a different distribution of the same materials will always and in all cases be determined inside each mould, as these components are moulded at the same time in traditional moulds, as caused by the different densities and fluidities thereof, wherein such a different distribution will in turn always and in all cases lead to the formation of a less dense and more fluid outer layer and a denser and less fluid inner layer that will perfectly blend and amalgamate with said outer layer, such a distribution being able to always take place regardless of the materials being actually used, as well as regardless of the blends forming said two components being introduced in either one of the plastic processing machines provided upstream of the moulding phase.

Figure 2:
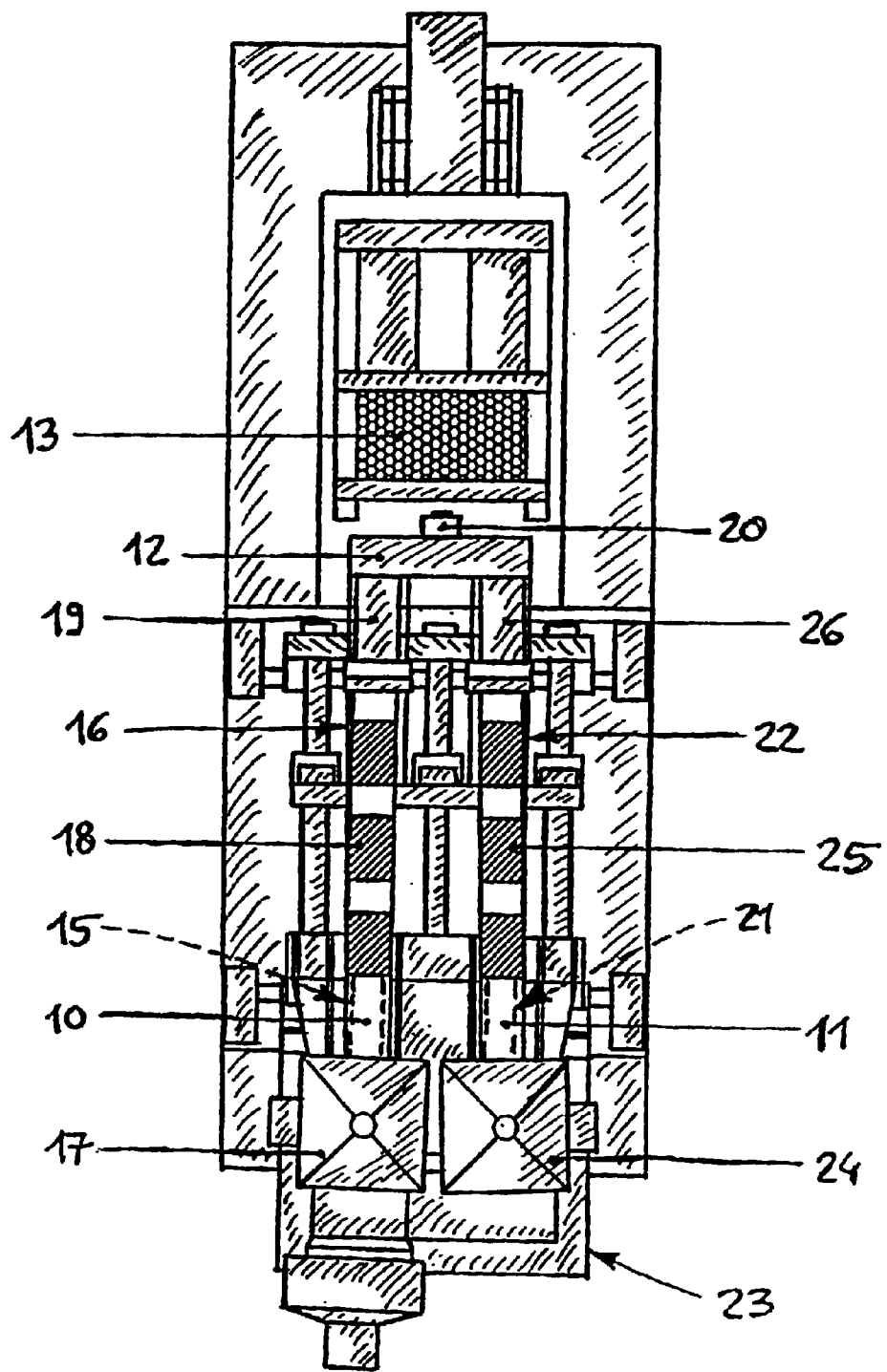
FIG. 2 is a schematical view of a part of the manufacturing apparatus shown in FIG. 1.

If reference is now made to FIGS. 1 and 2, which illustrate an apparatus provided for manufacturing products with the method according to the present invention, it can be noticed that this apparatus is substantially constituted by a first plasticizing-injection unit 10 for the preparation of the molten blend of said first component, a second plasticizing-injection unit 11, which is separated from, but adjacent to said preceding unit, for the preparation of the molten blend of said second component, at least an injection channel or nozzle 12 that is common to both said plasticizing-injection units 10 and 11 for mixing and injecting at the same time the molten masses flowing from both said units, and an array of moulds 13 for moulding the products to be manufactured into the respectively required shapes, sizes and aesthetics through the use of the so prepared blends, wherein said moulds are preferably provided in an arrangement that in this case is in the form of a carrousel 14, though it will be appreciated that they can also be provided in other appropriate configurations and arrangements within the capability of those skilled in the art.

In particular, said first plasticizing-injection unit 10 is preferably constituted by at least an extrusion screw 15 capable of rotating at a variable speed, with a length-to-diameter (L/D) ratio of at least 20-to-1, and with a compression ratio ranging from 1.2 to 2.8/3, wherein said screw is housed in an elongated rectilinear barrel 16, whose initial zone is associated to a large-capacity hopper 17 into which said previously shredded and appropriately mixed waste materials are fed, possibly in combination with said raw materials. Adequately rated and sized electric heating elements 18 are further provided in said barrel for heating up to plasticization and melting the blend formed by said waste materials, possibly combined with said raw materials, during the continuous rotation of said extrusion screw 15, whereas the terminal zone of said barrel 16 is provided with an injection unit 19 communicating with the injection channel 12 for the molten blend to be delivered thereinto owing to the action of said continuously rotating extrusion screw 15, wherein such an injection channel 12 is in turn provided with a co-injection head 20 for selectively injecting said molten blend into each one of the moulds 13 that is each time positioned in correspondence of said head.

This blend is enriched through the addition of stabilizing and blowing agents in the manner and to the purposes as indicated earlier in this description, and is heated up to a temperature of approx. 180° C. to 210° C. so as to cause all waste materials in the blend having melting temperatures equal to or lower than these values to melt and plasticize, as well as the remaining waste materials in the blend with higher melting temperatures to be compounded in the same molten blend, so as to give rise to a resulting formation of inert filling materials in the blend which will contribute to consolidating the same blend and making it stronger and stiffer when it is allowed to cool down after being removed from the respective forming mould 13. As soon as said plasticization and melting temperature is reached, said blend is ready for injection through the injection channel 12 into the inner cavity of the mould 13 being each time positioned in correspondence of the injection channel itself.

The second plasticizing-injection unit 11 is in turn preferably constituted by at least an extrusion screw 21 capable of rotating at a variable speed and having the same length-to-diameter (L/D) and compression ratios as the afore described screw 15, wherein even this screw is housed in an elongated rectilinear barrel 22 extending adjacently to the afore described barrel 16, in a parallel arrangement with respect thereto, and joined to said barrel through a load-bearing structure 23 that is common to both plasticizing-injection units, and wherein the initial zone of said barrel 22 is associated to a large-capacity hopper 24 into which said previously shredded and appropriately mixed waste materials are fed, possibly in combination with said raw materials. Adequately rated and sized electric heating elements 26 are further provided in said barrel to the same purposes as described above, whereas the terminal zone of said barrel 22 is provided with an injection unit 26 communicating with the injection channel 12 for the molten blend to be delivered thereinto owing to the action of said continuously rotating extrusion screw 21.

This blend, which is generally formed prevailingly by such materials as PPE and PE that are to be found to a large extent in the above mentioned waste materials, is enriched through the addition of colorants (master batches) of a per se known type in the desired hues, and is subsequently heated up to a temperature of approx. 180° C. to 210° C. so as to perform the same functions as the afore described blend.

At this point, the above blend is therefore ready for being injected through the injection channel 12 into the inner cavity of the mould 13 that is each time positioned in correspondence of said injection channel.

When both plasticized blends are ready, the same are injected at the same time from the injection channel 12, through the common co-injection head 20, into the mould 13 that is each time duly positioned in correspondence of said head, by the action of both said extrusion screws 15 and 21 being operated rotatably, under resulting compounding and amalgamation of the blends of both components of each product, as well as under swelling of the blend forming the core or inner portion of the product owing to the already described reasons, wherein the different density and fluidity properties of said blends cause the respective materials to distribute in the manner and to the purposes as described earlier in this description.

It should be finally noticed that the moulds 13 may be made of different materials, such as for instance aluminium, steel, special alloys, etc., and will be in any case provided with appropriate cooling channels (not shown) or other cooling arrangements adapted to allow the mould to effectively cool down upon its inner cavity having been filled with the above cited blends, to the purpose of significantly cutting the time needed for the products to be removed from the mould after moulding to appropriately cool down.

In a preferred manner, the moulds are used in the afore cited carrousel-like arrangement constituted by a plurality of mould-carrying stations, in which each such station is duly equipped so as to be able to cool down the mould upon the blends having been injected into it, and is further so arranged as to be able to allow the finished product to be removed from the mould upon conclusion of the cool-down phase.

The removal of the finished products from each mould and the post-moulding finishing of the same products will include such operations as trimming to remove flashes and gates, embossing (if required) and/or other aesthetical or structural finishes.

As a result, the use of the product manufacturing method and apparatus according to the present invention enables heterogeneous waste materials to be recovered and most effectively recycled in a simple manner, as well as the same materials to be homogeneously blended together without any problems of incompatibility, blendability and damageability of the materials involved, as well as without any development of toxic or noxious substances during processing, under resulting considerable reductions in overall costs owing to the low cost of such waste materials, while at the same time significantly contributing to relieving the general waste disposal problem.

If reference is now made to the remaining FIGS. 3 through to 17, these can be noticed to illustrate products of various kind that are capable of being manufactured with the method and the apparatus according to the invention, wherein said products can be constituted by structural parts and outer finishes for office furniture, as well as furniture for cinematograph theatres, concert halls, communities and the like, by furniture of other kinds, and related component parts such as doors, shutters, panels, frames and the like, or again by products of any other type for the most varied applications.

FIGS. 3 to 5, in particular, illustrate by way of example a sitting surface, i.e. the seat 27 of a chair or armchair for office desk, shown with its bosses duly applied, moulded in an approximately quadrangular shape with a reduced thickness (see FIG. 4), and constituted by a layered structure formed by a thin outer coating portion or skin 28 resulting from the blend of the afore mentioned second component, and a thicker inner portion or core 29 resulting from the blend of the afore mentioned first component.

FIGS. 6 to 8 illustrate a back 30 for office chairs, which is again in an approximately quadrangular, downward tapered shape and is constituted by a layered structure formed with the same portions as the part shown in the afore cited Figures, so that they are indicated using the same reference numerals.

FIGS. 9 to 11 illustrate an arm 31 for office chairs, which is in a rhomboidal shape, whose layered structure is identical to the one of the parts shown in FIGS. 3 through to 17, so that the same reference numerals are used again to indicate the portions thereof.

Figures 12, 13:
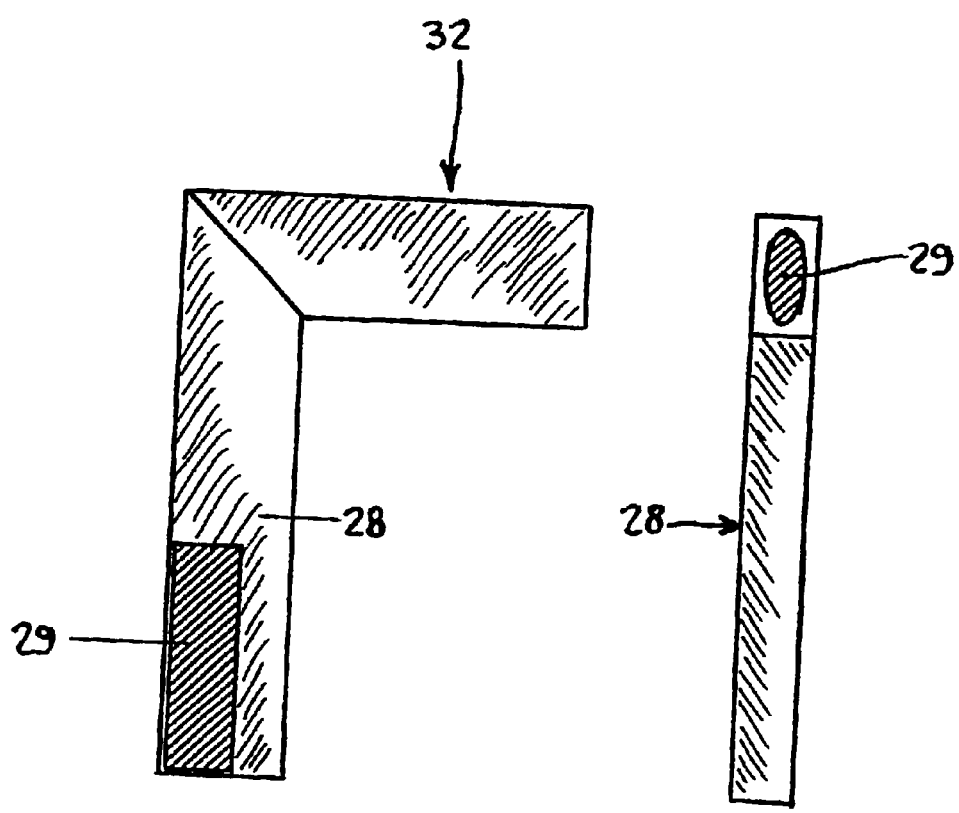
FIG. 12 is a schematical, partially sectional front view of another product capable of being manufactured with the method according to the present invention.
FIG. 13 is a side view of the product of FIG. 12.
Figure 15:
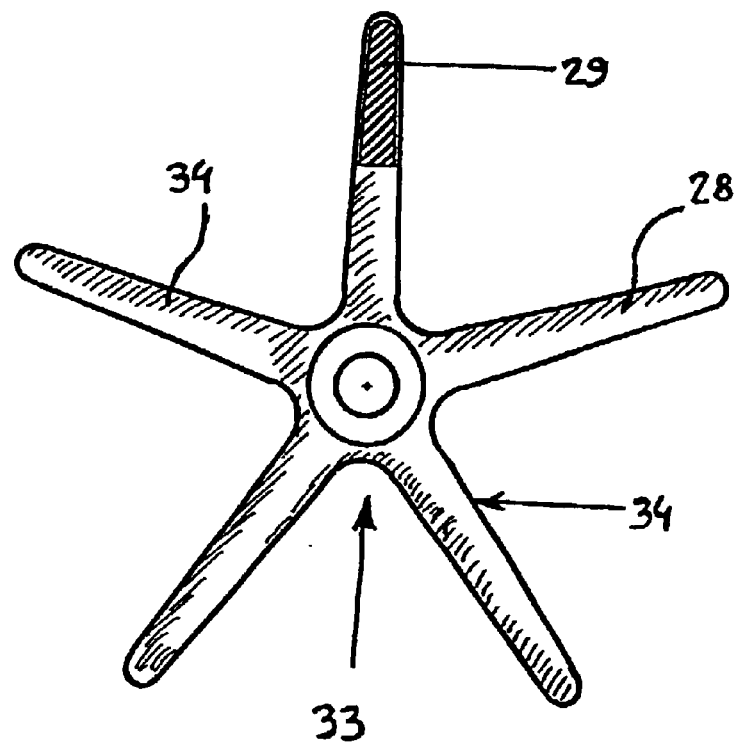
FIG. 15 is a schematical, partially sectional plan view of the product of FIG. 14.
Figure 14:
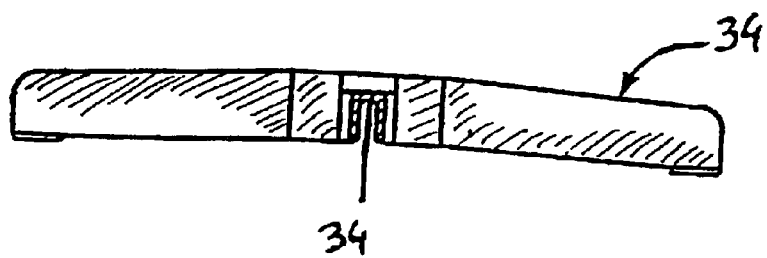
FIG. 14 is a front view of yet another product obtained with the manufacturing method according to the present invention.
Figure 16:
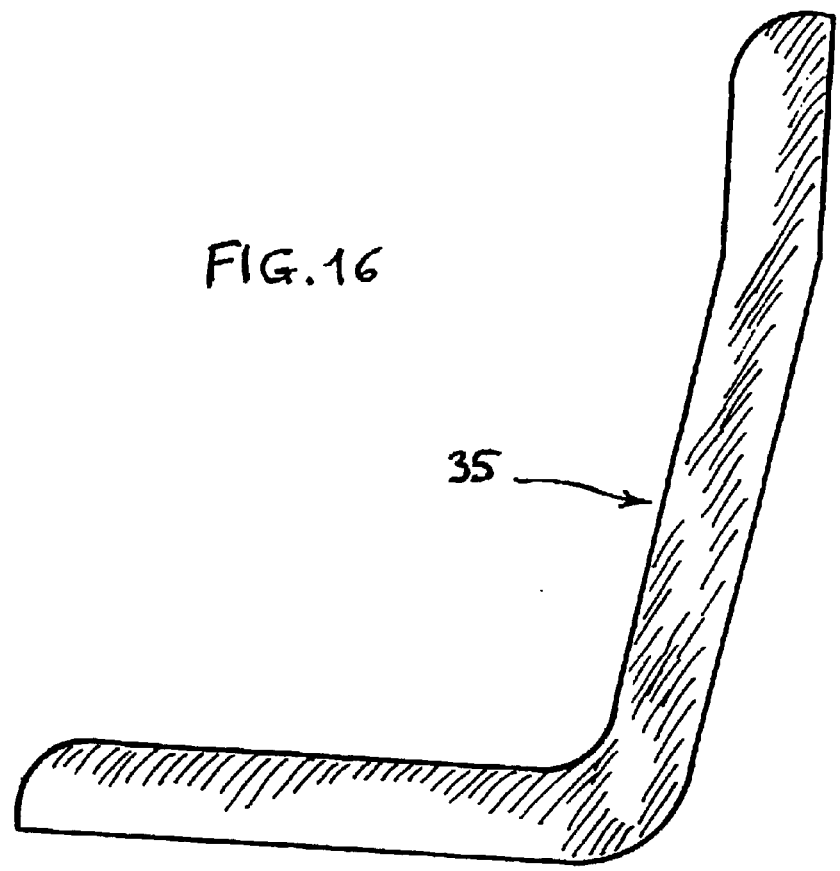
FIG. 16 is a side view of yet another product capable of being manufactured with the method according to the present invention.
Figure 17:
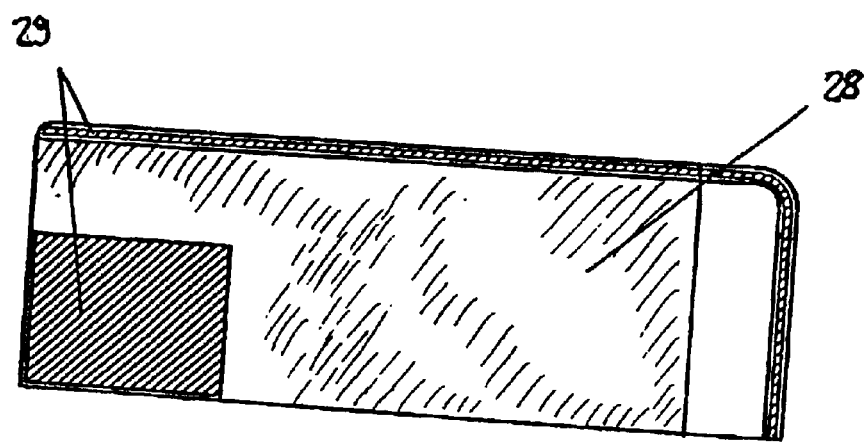
FIG. 17 is a schematical, partially sectional plan view of the product of FIG. 16.

Finally, even the remaining products illustrated by mere way of example in the other Figures are formed in the same manner with a layered structure which is therefore identified with the same reference numerals as used in the preceding Figures. In particular, FIGS. 12 and 13 illustrate a door frame 32 for furniture of various kind; FIGS. 14 and 15 illustrate an armchair base 33 for office furniture formed by an array of spokes 34 in a spider-like arrangement; and FIGS. 16 and 17 illustrate the shell 35 of an armchair for use in a manager office.

In an advantageous manner, all such component parts of furniture pieces are moulded with the use of mould that are carried by a carrousel-like arrangement of the afore described type, since the thickness of these products (which is usually of at least 6 mm) requires a cool-down time that cannot be shorter than a given limit (approx. 150 seconds), which is in this case easily complied with since the products that are moulded under hot conditions are then allowed to rotate in said carrousel-like arrangement from the moulding station through to the unloading or removal station, otherwise the same products are quite likely to undergo permanent distortions that would alter the structure thereof.

Such a cool-down time limit might on the other hand be complied with also in the case that injection-moulding machines of a traditional single-station type are used. However, manufacturing costs would in this case unavoidably rise to extremely high, by all means unsustainable levels.

What is claimed is:

1. A product of manufacture obtained by utilizing heterogeneous waste material plastics consisting of plastics from recycling processes, plastics from sorted-out waste collection systems, plastics from solid urban wastes, plastics from industrial processing scraps, and mixtures thereof, said plastics having different melting temperatures and being prevailingly constituted by polyolefins and a heterogenous mix of non-compatible plastic materials by utilizing molding means, said products being each constituted by a layered structure provided with a not-visible thicker inner portion and a visible thin outer portion surrounding and coating said inner portion of product, wherein said waste materials are in succession shredded into small-sized particles and mixed together in mixing apparatus, thereby forming a first compound constituting a first component of each product adapted to provide for said not-visible inner portion of each product, and a second compound separated from the first compound constituting a second component of each product adapted to surround and coat said inner portion of product and provide for said visible outer portion of product, wherein said first and second compounds are subsequently heated separately from each other, under previous addition of heat stabilizing means and blowing means in the first compound adapted to swell the first compound during its heating and coloring means in the second compound, to a pre-determined heating temperature, thereby bringing about respectively a first and a second plasticized mass, whose materials include plastic materials having melting temperatures higher than said heating temperature incorporated in said mass, thereby behaving like inert filling materials, and wherein said first and second plasticized mass are injected at the same time into said moulding means shaped as the respective products, by mixing homogenously with each other so as to form a compound with lower density and higher flowability and a compound with higher density and lower flowability, determined by said inert filling materials, wherein said compound having lower density and higher flowability forms said outer portion of product surrounding said compound having higher density and lower flowability which forms said inner portion of product and the inner and outer portions are blended and amalgamated.

2. The product according to claim 1, wherein said product is constituted by structural parts and outer finishes for office furniture, general furniture, furniture for communities, cinema theatres, concert halls.

3. The product according to claim 1, wherein said small-sized particles are comprised between approximately 1 and 10 mm.

4. The product according to claim 3, wherein said blowing means comprise a hexantriolethylcycloexyltriazol-azo discarbonamide, in percentages comprised between approximately 0.2 and 1 percent by volume with respect to those of the related compound.

5. The product according to claim 1, wherein the polyolefins which prevailingly constitute the waste material plastics are low density polyethylene, linear low density polyethylene, high density polyethylene, medium density polyethylene, polypropylene homopolymer, and polypropylene copolymer, with different and variable percentages of the individual components.

6. The product according to claim 1, wherein the non-compatible plastic materials of the waste material plastics are polyethylene terephtalate, polyamides, polyvinylchloride, acrylonitrile butadyene-styrene copolymer, polystyrene, polyoxidemethylene, and various polymeric alloys, with different and variable percentages of the individual components.

7. The product according to claim 1, wherein waste material wood, minerals, and metallic materials are mixed with the waste material plastics.

8. The product according to claim 1, wherein raw plastic materials are mixed with the waste material plastics.

9. The product according to claim 7, wherein raw material wood, minerals, and metallic materials are mixed therein.

* * * * *